US006796591B2

(12) United States Patent
Yanagita

(10) Patent No.: US 6,796,591 B2
(45) Date of Patent: Sep. 28, 2004

(54) GLOVE COMPARTMENT AND CUP HOLDER DEVICE FOR AUTOMOBILE

(75) Inventor: Yosuke Yanagita, Utsunomiya (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/611,886

(22) Filed: Jul. 3, 2003

(65) Prior Publication Data
US 2004/0084921 A1 May 6, 2004

(30) Foreign Application Priority Data
Oct. 31, 2002 (JP) ......................... 2002-317532

(51) Int. Cl.[7] .............................. B60R 7/04; B60R 7/06
(52) U.S. Cl. .................................. 296/37.8; 296/24.34
(58) Field of Search ............................ 296/24.3, 24.34, 296/37.1, 37.8, 37.9, 37.14; 224/400, 483, 281, 485, 926, 933; 248/311.2

(56) References Cited

U.S. PATENT DOCUMENTS

| 4,708,386 A | * | 11/1987 | Moore et al. ............... 296/37.8 |
| 4,902,061 A |   | 2/1990  | Plavetich et al. |
| 5,887,596 A | * | 3/1999  | Ziegler et al. ............... 131/231 |
| 5,921,519 A | * | 7/1999  | Dexter et al. ............. 248/311.2 |
| 6,039,296 A | * | 3/2000  | Nishina et al. ........... 248/311.2 |
| 6,059,243 A | * | 5/2000  | Hikage et al. ............ 248/311.2 |
| 6,419,314 B1 | * | 7/2002 | Scheerhorn ............ 297/188.19 |
| 6,702,352 B2 | * | 3/2004 | Nakanishi et al. .......... 296/37.8 |
| 6,719,344 B2 | * | 4/2004 | Ono et al. .................. 220/813 |
| 6,719,367 B2 | * | 4/2004 | Mic et al. .............. 297/188.19 |
| 2003/0042383 A1 | * | 3/2003 | Ogura ..................... 248/311.2 |
| 2003/0137158 A1 |  | 7/2003 | Nakanishi et al. |
| 2003/0155786 A1 | * | 8/2003 | Kim et al. ................. 296/24.1 |

FOREIGN PATENT DOCUMENTS

| DE | 199 08 130 |   | 8/2000 |
| FR | 2 769 270  |   | 4/1999 |
| JP | 405050876  | * | 3/1993 | ............... 296/37.8 |
| JP | 11-42974   |   | 2/1999 |

* cited by examiner

Primary Examiner—D. Glenn Dayoan
Assistant Examiner—H. Gutman
(74) Attorney, Agent, or Firm—Manabu Kanesaka

(57) ABSTRACT

A glove compartment and cup holder device includes a box member, a sliding lid for closing an opening of the box member, and a supporting member attached to a sliding lid. The supporting member is freely slidable along the opening of the box member for supporting a container. When the sliding lid is opened, the supporting member slides in and overlaps with the sliding lid. Only when the glove compartment and cup holder device is used as the cup holder, the supporting member is pulled out from the sliding lid. Therefore, the supporting member does not block the opening of the box member when the glove compartment and cup holder device is used as the glove compartment.

6 Claims, 4 Drawing Sheets

GLOVE COMPARTMENT AND CUP HOLDER DEVICE FOR AUTOMOBILE

BACKGROUND OF THE INVENTION AND RELATED ART STATEMENT

The present invention relates to a glove compartment and cup holder device for an automobile.

In a glove compartment and cup holder device for an automobile disclosed in Japanese Patent Publication (Tokkai) No. 11-42974, a box member is attached to a rear surface (a surface opposite to a passenger) of a console box to be freely pulled out. The glove compartment and cup holder device can be used as a glove compartment and a supporting device for a beverage container such as a can, bottle, paper cup, etc.

According to the conventional device, a holder plate as a member for supporting a beverage container is urged to maintain a horizontal position. Therefore, the holder plate constantly blocks a part of an opening of the box member. In storing a card, coin, and so on in the box member, the supporting member for the beverage container blocks the finger for insertion, thereby significantly lowering convenience of the glove compartment.

The present invention is provided in order to solve the problem, and an objective of the invention is to provide an improved glove compartment and cup holder device having both functions of a cup holder and a glove compartment at a high quality level.

Further objects and advantages of the invention will be apparent from the following description of the invention.

SUMMARY OF INVENTION

In order to achieve the above-mentioned purposes, according to the present invention, a glove compartment and cup holder device includes: a box member; a sliding lid for closing an opening of the box member; and a supporting member attached to a sliding lid to be freely slidable along the opening of the box member for supporting a beverage container.

With the configuration above, when the sliding lid is opened, the supporting member slides in and overlaps with the sliding lid. Only when the glove compartment and cup holder device is used as the cup holder, the supporting member is pulled out from the sliding lid. Therefore, the supporting member does not block the opening of the box member when the glove compartment and cup holder device is used as the glove compartment.

In addition to the above-mentioned structure, a relative displacement control device (a downward projection and an upward projection) is provided between the supporting member and the box member for controlling movement of the supporting member when the sliding lid slides. The relative displacement control device restrains the supporting member so that a projecting end of the supporting member is positioned at a limit position where the projecting end of the supporting member does not abut against an inner surface of the box member.

With the above configuration, when the supporting member is pulled out, the supporting member is fixed to the box member. As a result, when the sliding lid is closed, the supporting member does not abut against the box member, thereby preventing damage on the device.

DETAILED DESCRIPTION OF PREFERRED EMBODIMENTS

Hereunder, embodiments of the present invention will be described in detail with reference to the accompanying drawings.

Figure 1:
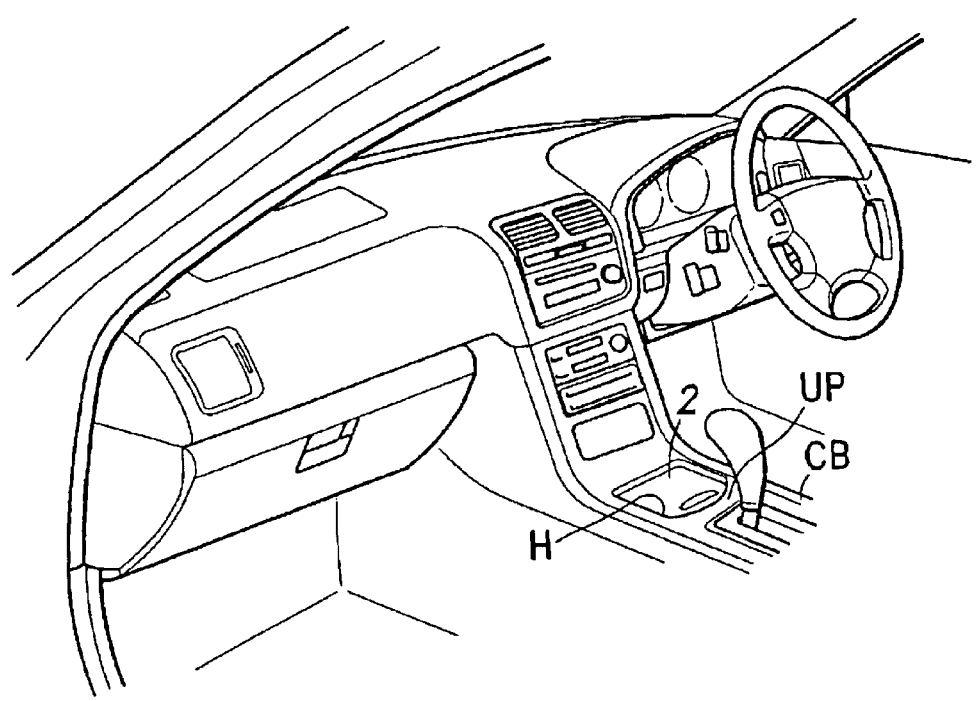
FIG. 1 is a perspective view showing an area around a driver seat of an automobile according to the present invention.

FIG. 1 a perspective view showing an area around a driver seat of an automobile to which the present invention is applied. A glove compartment and cup holder device 1 of the present invention is disposed in front of a console box CB extending in a front-to-rear direction of the automobile between the driver seat and a passenger seat. An opening H is formed in an upper plate UP of the console box CB. A sliding lid 2, a part of the device of the present invention, is provided at the opening H to freely slide back and forth.

Figure 2:
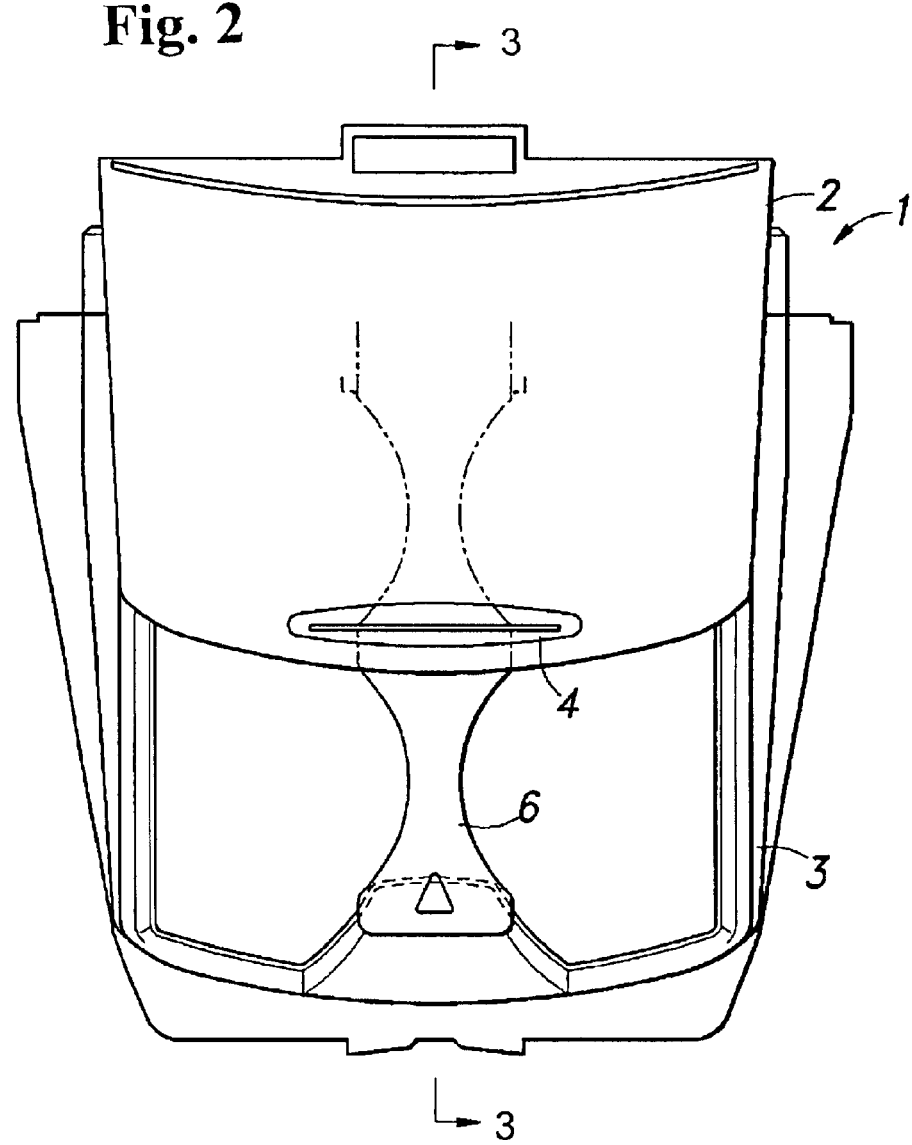
FIG. 2 is a top view of a device of the present invention.
Figure 3:
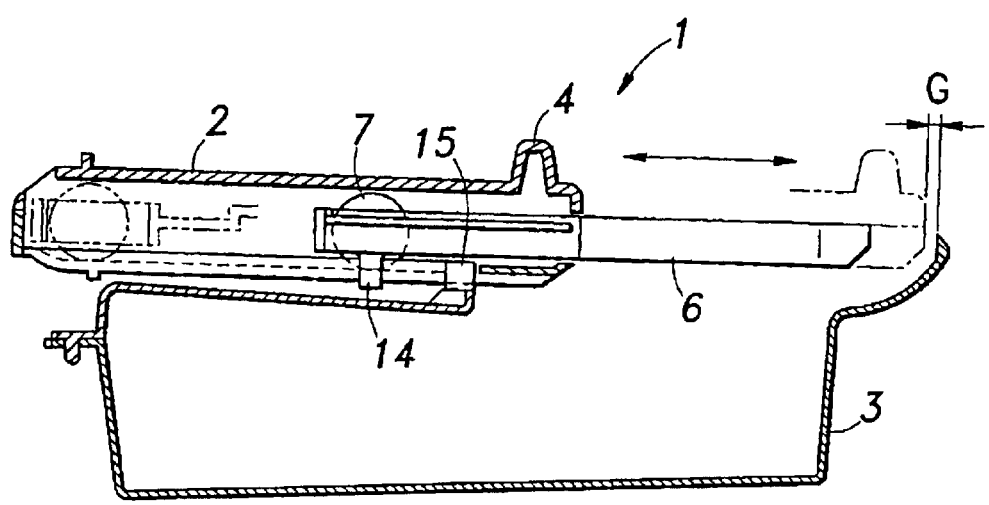
FIG. 3 is a cross sectional view of the device taken along line 3—3 in FIG. 2.
Figure 4:
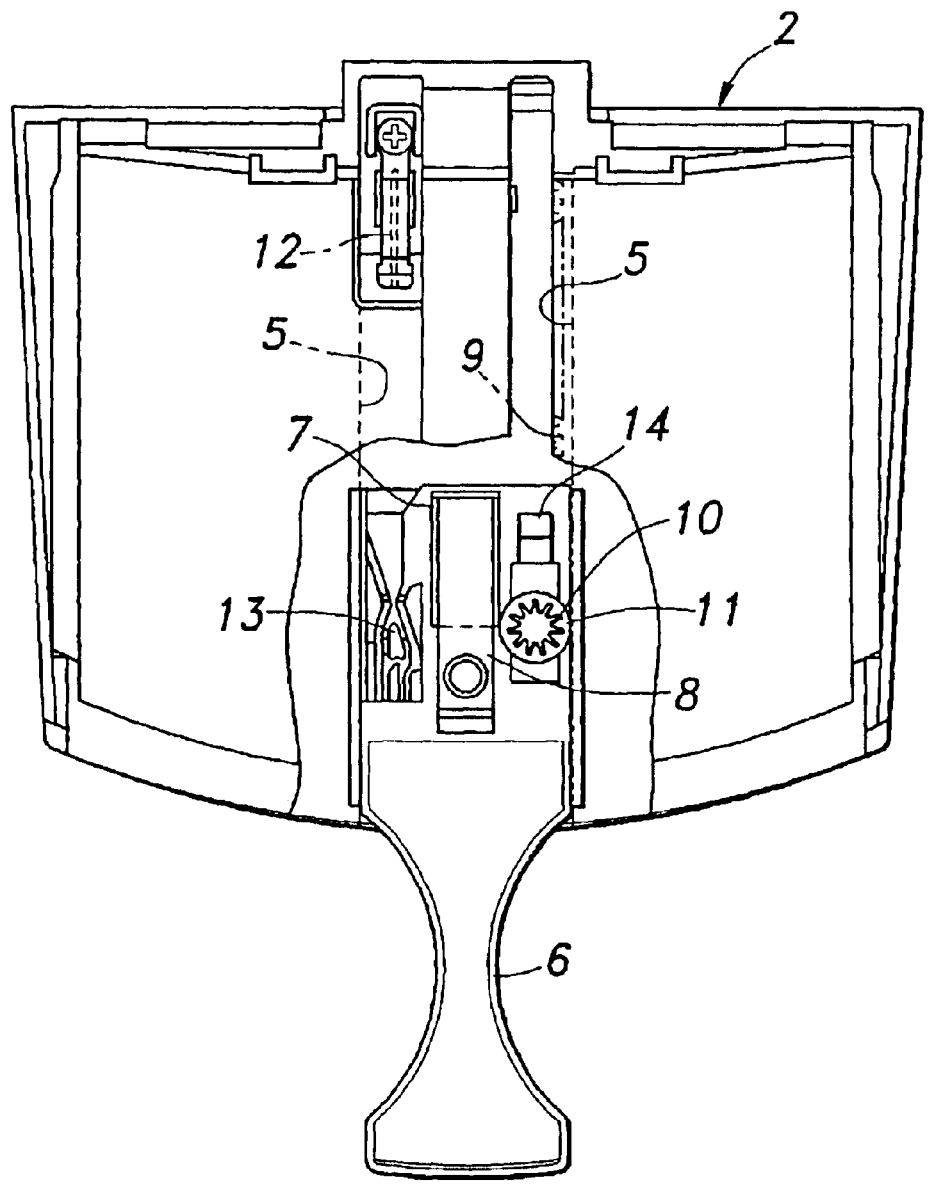
FIG. 4 is a bottom view of the device with a part of a lid removed.

As shown in FIGS. 2–4, the glove compartment and cup holder device 1 includes the sliding lid 2 sliding along a lower surface of the upper plate UP of the console box CB in the front-to-rear direction; and a box member 3 disposed in the console box CB.

The sliding lid 2 is attached to the box member 3 so that the sliding lid 2 moves along the opening of the box member 3 fixed to the lower surface of the upper plate UP of the console box CB. A finger grip 4 projects on an upper face of the sliding lid 2 at a rear end thereof (close to a passenger), so that a fingertip is hooked on the finger grip 4 to open and close the sliding lid 2. When the sliding lid 2 is pushed forward, the sliding lid 2 is stored below the upper plate UP of the console box CB and the opening H is opened just like a situation such that a sliding lid is stored inside a door case when the sliding door is pulled to open. When the sliding lid 2 is pulled out, the sliding lid 2 closes the opening H.

The sliding lid 2 is formed in a hollow body. A supporting member 6 engages a guide rail 5 (refer to FIG. 4) formed inside the sliding lid 2 and slides freely back and forth.

A constant force spring 8 has one end attached to a lower surface of the sliding lid 2 and the other end wound on a bobbin 7 attached to a front end of the supporting member 6. The spring 8 always urges the supporting member 6 toward the rear side in a direction that the supporting member 6 projects from a rear end of the sliding lid 2.

A rotary damper 11 is provided at one side of the supporting member 6 in a lateral direction, and is directly attached to a pinion 10 engaging a rack 9 integrally formed on an inner surface of the sliding lid 2. A latching mechanism is provided at the other side of the supporting member 6, and has a heart cam 13 capable of engaging a spring pin 12 fixed to the lower surface of the sliding lid 2 at the front end thereof.

Incidentally, a projecting direction driving mechanism by the constant force spring 8, the projecting speed adjusting mechanism by the rotary damper 11, and alternate type latching mechanism may be substituted by mechanisms known in the art in the sliding devices.

A downward projection 14 is provided on a lower surface of the supporting member 6 at an appropriate location (front end side). Also, an upward projection 15 is provided on an upper surface of the box member 3 at an appropriate location (intermediate portion in the front-to-rear direction). The upward projection 15 is able to engage the downward projection 14.

A process of using the device of the present invention will be explained next.

As described above, when the sliding lid 2 is pushed forward, the opening H is opened, and when the sliding lid 2 is pulled backward, the opening H is closed. When the opening H is opened, most of the sliding lid 2 is stored inside the console box CB, and a back end surface of the supporting member 6 is exposed from a back end edge of the sliding lid 2. When the back end surface of the supporting member 6 is pushed forward only for an over-stroke of the latching mechanism with the heart cam 13, the latching mechanism is released. As a result, the supporting member 6 starts to move backward at an appropriate speed due to an urging force of the constant force spring 8 and a resistance force of the rotary damper 11.

As shown by a solid line in FIG. 2, the supporting member 6 projects at the middle of the box member 3 in the lateral direction, so that the supporting member 6 is ready to hold containers as cup holders. When the supporting member 6 is fully pushed forward, the latching mechanism is locked, and the supporting member 6 stays inside the sliding lid 2 in the stored state (shown by phantom line in FIG. 2).

When the sliding lid 2 is pulled out backward in a state where the supporting member 6 projects out of the sliding lid 2, the supporting member 6 moves back with the sliding lid 2 up to a certain point. When the downward projection 14 on the supporting member 6 engages the upward projection 15 on the box member 3, the supporting member 6 stops and stays with the box member 3. Accordingly, when the sliding lid 2 is fully closed, the supporting member 6 is stored inside the sliding lid 2. The supporting member 6 does not over-stroke to a point where the latching mechanism is locked, and the supporting member 6 is stored inside the sliding lid 2.

The end of the supporting member 6 projects up to a limit position so that there is an appropriate gap G between the end of the supporting member 6 and an inner surface of the back wall of the box member 3. With this configuration, the supporting member 6 does not hit the box member 3, thereby preventing damage on a design surface.

When the sliding lid 2 is opened in this state, the sliding lid 2 moves while the supporting member 6 is stationary, As a result, the supporting member 6 projects at the middle of the box member 3 in the lateral direction. When the supporting member 6 is pushed after the sliding lid 2 is opened, the latching mechanism is locked and the supporting member 6 is stored inside the sliding lid 2. Therefore, there is no obstacle on the opening of the box member 3, and the glove compartment is easy to use. In the state that the sliding lid 2 is opened, it is possible to pull out only the supporting member 6 from the sliding lid 2.

According to the present invention, the supporting member is stored inside the sliding lid, and the supporting member can be taken in and out independently of the sliding lid. Further, when the lid is closed in the state where the supporting member is projected, the supporting member is automatically stored inside the lid. Therefore, the structure can be effectively used as a cup holder and a glove compartment at a high quality level.

Further, according to the invention, the supporting member is locked to the box member in the projected state. Therefore, the supporting member does not hit the box member when the sliding lid is closed, thereby preventing damage on the design surface.

While the invention has been explained with reference to the specific embodiments of the invention, the explanation is illustrative and the invention is limited only by the appended claims.

What is claimed is:

1. A glove compartment and cup holder device for an automobile, comprising:
   a box member having an opening;
   a sliding lid slidably attached to the box member for opening and closing the opening of the box member; and
   a supporting member for supporting a container, said supporting member being slidably attached to the sliding lid so that the supporting member can be located within the sliding lid while the sliding lid is opened and closed relative to the opening, and can be disposed at the opening while the sliding lid is opened.

2. A glove compartment and cup holder device according to claim 1, further comprising a latch mechanism formed between the supporting member and the sliding lid for locking the supporting member relative to the sliding lid.

3. A glove compartment and cup holder device according to claim 2, further comprising an urging member formed between the supporting member and the sliding lid for urging the support member in a direction that the supporting member projects from the sliding lid, and a damper formed between the supporting member and the sliding lid for controlling a speed that the supporting member projects from the sliding lid.

4. A glove compartment and cup holder device according to claim 1, wherein said sliding lid has a hollow body so that the supporting member is slidably disposed inside the sliding lid.

5. A glove compartment and cup holder device according to claim 1, further comprising a control device provided between the supporting member and the box member for controlling a position of the supporting member so that an end of the supporting member does not contact the box member when the supporting member projects from the sliding lid.

6. A glove compartment and cup holder device according to claim 5, wherein said control device includes a first projection formed on the supporting member and a second projection formed on the box member.

* * * * *